Nov. 11, 1924.                    1,515,179
J. W. SMITH ET AL
NUT LOCK
Filed March 16, 1923
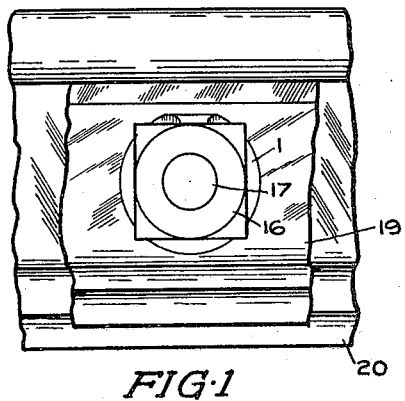
FIG·1
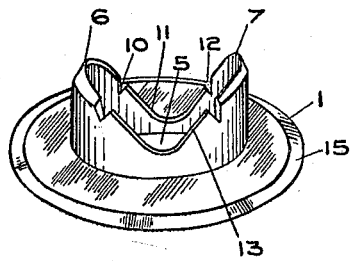
FIG·3·
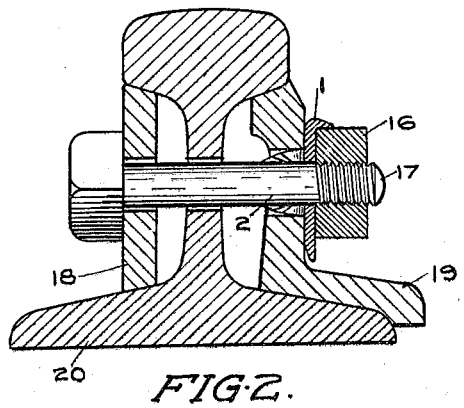
FIG·2·
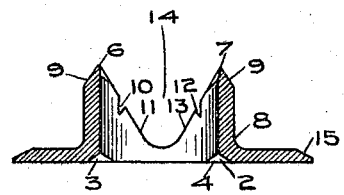
FIG·4
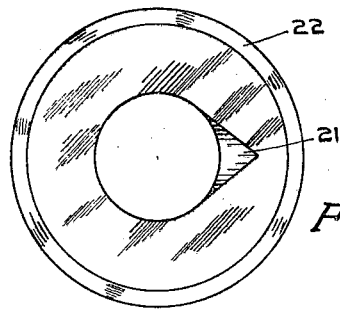
FIG·5.
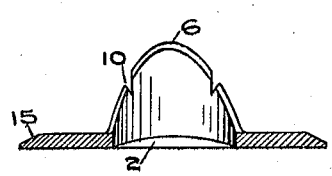
FIG·6·
Inventor
J.W. Smith + J.W. Carson
By E.J. Fetherstonhaugh
Attorney Patented Nov. 11, 1924.

1,515,179

UNITED STATES PATENT OFFICE.

JAMES WILSON SMITH AND JOHN WILLIAM CARSON, OF PICTOU, NOVA SCOTIA, CANADA.

NUT LOCK.

Application filed March 16, 1923. Serial No. 625,536.

*To all whom it may concern:*

Be it known that we, JAMES WILSON SMITH and JOHN WILLIAM CARSON, both subjects of the King of Great Britain, and residing in the town of Pictou, in the Province of Nova Scotia, in the Dominion of Canada, have invented a new and useful Improvement in a Nut Lock, of which the following is the specification.

The invention relates to nut locks as described in the present specification and shown in the accompanying drawings that form part of the same.

The invention consists essentially of the novel features pointed out broadly and specifically in the claim for novelty following a description containing an explanation in detail of an acceptable form of the invention.

The objects of the invention are to produce a nut lock particularly for rail joints, to simplify the construction and thereby economize in the costs of production in locking devices for railway joints and produce a plate or washer for the purpose applicable to any nut and bolt having regard of course to size; to insure safety to lives and property in eliminating the loosening of a joint, to reduce the cost of maintenance and eliminate the destruction of the fastening means in repairs and replacements; and generally to provide a serviceable, durable and efficient nut lock.

In the drawings, Figure 1 is a front elevation of the nut and bolt end, showing a fragmentary view of rails and joint plate.

Figure 2 is a cross sectional view of a rail joint, showing the nut lock.

Figure 3 is a perspective detail of the locking plate or washer.

Figure 4 is a vertical sectional view of the plate or washer.

Figure 5 is a detail of a modified form of washer.

Figure 6 is a horizontal sectional view of the plate or washer.

Like numerals of reference indicate corresponding parts in the various figures.

Referring to the drawings, the locking plate or washer 1 is formed with a bolt hole 2 which is oval in outline on the face but is inclined inwardly by the bevels 3 and 4 to form the substantially circular passage 5 between the semi-circular walls 6 and 7.

The walls 6 and 7 are integral with the plate 1 and in section taper from their thick inner end 8 to the outer bevelled edges 9 and follow the shape of the hole on the outer sides and fill in on the inner sides to fit the bolt, the wall 6 having the V-shaped slots 10 in the receding edges 11 extending to the circumference of the hole and towards the plate 1, and the wall 7 having the V-shaped slots 12 in the receding edges 13 extending to the circumference of the hole and towards the plate 1, these walls forming in elevation from the plate 1 sides to central V-shaped cuts 14. The edge portion of the plate 1 which is preferably circular is bevelled as shown at 15 and is intended to facilitate the turning of the plate or washer over the nut 16 screwing on the bolt 17.

The bolt 17 is inserted through the hole in the plate 1 and the passage between the walls 6 and 7 and is supposed to fit closely to the passage walls, but of course in the rough work of railway joint construction naturally it is not a machine fit, but quite close enough to avoid play. The bolt extends through the joint plates 18 and 19 and through the rail 20 and as it is customary to have oval holes in both joint plates and rails to permit expansion and contraction in the latter, at least one oval hole in the joint plates must be filled in at each side of the bolt and this is done by drawing the walls 6 and 7 into the joint plate 19 before screwing on the nut and as these walls are notched and bevelled a very tight fit is assured and at the same time a snug central hole for the bolt, which is thus centrally held in the oval hole in the rail leaving the latter free for expansion and contraction without disturbing the joint.

The plate or washer 1, when driven into place leaves the threaded end of the bolt 17 free for the nut 16, which is then screwed on and by means of a suitable tool the plate is knocked outwardly over any flat surface on the nut and it will be seen that the bevel materially assists this in forming an abutting surface for the tool.

In Figure 5 the washer illustrated is formed with a tapered form of wall 21 adapted for a pear shaped orifice in a joint plate and having a similar bevel 22.

What we claim is:—

In a nut lock, a circular washer having a bevelled edge, an oval hole and a wall at each side inclined inwardly to the centre of the bolt hole and forming from the ends of the incline an inwardly extending circular passage for the bolt, said wall being bevelled at the inner ends on either side and having weakening slots at finish of the bevels.

Signed at Pictou, Nova Scotia, this twelfth day of February, 1923.

JAMES WILSON SMITH.
JOHN WILLIAM CARSON.

Witnesses:
GLADYS SPROULL,
JOHN U. ROSS.